Oct. 30, 1934.  H. HANSEN  1,978,628
KEY CUTTING MACHINE
Filed June 28, 1932
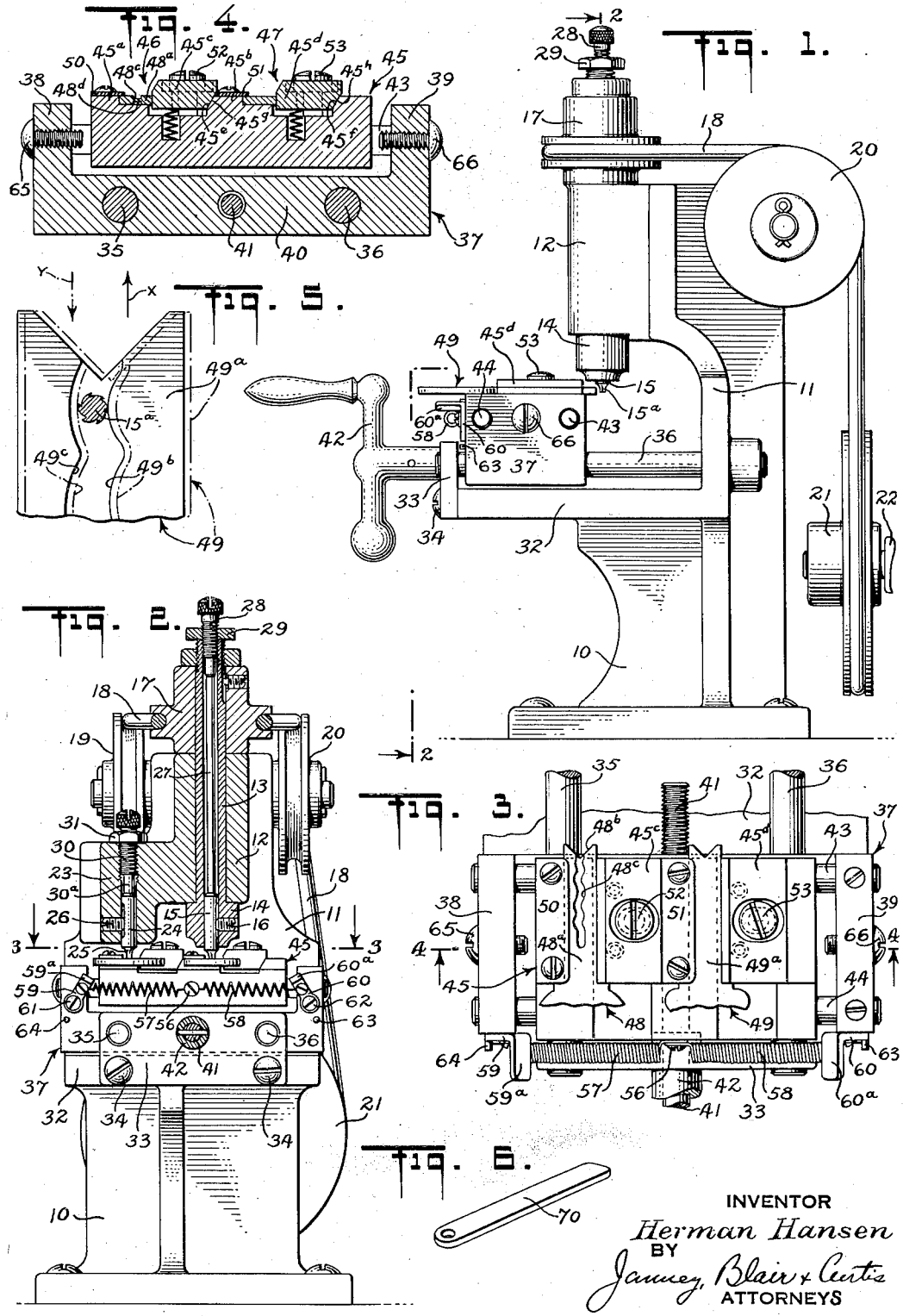
INVENTOR
Herman Hansen
BY
Janney, Blair & Curtis
ATTORNEYS Patented Oct. 30, 1934

1,978,628

UNITED STATES PATENT OFFICE 1,978,628

KEY CUTTING MACHINE

Herman Hansen, New York, N. Y., assignor to Francis Keil & Son, Inc., a corporation of New York Application June 28, 1932, Serial No. 619,711

14 Claims. (Cl. 90—13.05)

This invention relates to an apparatus for cutting or duplicating keys.

One of the objects of this invention is to provide a simple, compact, practical, and inexpensive key cutting apparatus for cutting particularly keys of the so-called "bell style" and which keys have an irregularly shaped groove extending longitudinally of and intermediate of the side edges of the key shank. Another object is to provide an apparatus of the above-mentioned character that will be efficient and reliable in action and capable of speedy and dependable operation in practical use. Another object is to provide a simple and practical apparatus for duplicating keys of the above-mentioned character that may be readily and economically and conveniently operated in practice. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown a preferred embodiment of the mechanical features of my invention, Figure 1 is a side elevation of the complete apparatus;

Figure 2 is a view as seen from the left of Figure 1, certain parts being shown in vertical section, however, the view being taken along the line 2—2 of Figure 1;

Figure 3 is a plan view on an enlarged scale, more particularly as seen along the line 3—3 of Figure 2;

Figure 4 is a vertical central sectional view as seen along the line 4—4 of Figure 3;

Figure 5 is a detached view on a still greater scale showing the relation between the key blank and the cutter, and Figure 6 is a perspective view of a gage that may be employed for setting certain parts of the apparatus.

Similar reference characters refer to similar parts throughout the several views of the drawing.

Referring now first to Figures 1 and 2, I provide a base or frame 10 having an upwardly directed standard 11 which is shaped as at 12 to provide a vertical bearing for a spindle 13 whose lower end has secured thereto or is shaped to provide a chuck 14 adapted to receive a tool or cutter 15 which may be locked or held in place as by the set screw 16, as is better shown in Figure 2.

The upper end of the spindle 13 has secured or keyed thereto in any suitable manner a pulley 17 by which the spindle may be rotated, preferably at a relatively high speed which may approach 3000 or 4000 R. P. M. The drive may be of any suitable character and illustratively may be effected as by a belt 18 which runs over idler pulleys 19—20 and then about the driving pulley 21 (Figure 1) of a motor or other suitable source of power 22.

The chuck 14 and the pulley 17 (Figures 1 and 2) and the bearing portion 12 have their contacting surfaces suitably machined or faced off so as to form virtually thrust bearings for the spindle 13, holding the latter against up and down movement and I prefer this arrangement where, as I describe in greater detail hereinafter, I provide an arrangement for raising or lowering the cutter 15 relative to the chuck 14 and spindle 13.

The standard 11 has an extension 23 (Figure 2) that is directed downwardly and to the left of the bearing 12; this extension 23 is bored out to receive the cylindrical shank 24 of a guide 25 which may be locked in position as by the set screw 26, the guide 25, substantially cylindrical in shape, and the cutter portion 15$^a$, likewise substantially cylindrical in shape, being alined transversely of the frame 10; that is, as viewed in Figure 1, the guiding stud 25 is spaced to the rear of and alined with the cutter 15$^a$.

Both cutter and guide 25 may be set as to their vertical position, as viewed in Figures 1 and 2. For this purpose the spindle 13 which drives the cutter 15 is preferably hollow or is made in the form of a sleeve so that it may receive a plunger or rod 27 whose upper end is engaged by a screw 28 threaded into the upper threaded end of the sleeve-like spindle 23 so that, upon loosening the set screw 16 of the chuck 14, the screw 28 may be backed off or screwed farther into the spindle 13, the rod 27 thus correspondingly limiting the extent to which the cutter shank 15 may be inserted into the chuck 14 and thus fixing the vertical height of the lower end face of the cutter 15$^a$, set screw 16 being tightened up to lock the cutter in its desired position. A lock nut 29 threaded onto the shank of the screw 28 and abutting against the spindle 13 may be used to lock the screw in its adjusted position.

As for making a corresponding setting of the guide stud 25, the bored out portion of the frame extension 23 is threaded at its upper end and receives a screw 30 whose lower end 30$^a$ limits the extent to which the shank 24 of the guide 25 may be received within the part 23, a lock nut 31 locking the screw 30 in its set position.

Thus cutter 15ª and guide stud 25 may be set at will and have their lower plane end faces brought into the same horizontal plane, preferably with the aid of devices hereinafter described.

The parts 12 and 23 of the standard 11 will be seen as viewed in Figure 1 to overhang a horizontal extension 32 formed integrally with the frame 10 and extension 32 has at its left-hand end (Figures 1 and 2) an upstanding plate 33 which is preferably secured to the extension 32 as by the screws 34. Overlying but spaced upwardly from the extension 32 and bridged between the front plate support 33 and the standard 11 are two guide rods 35 and 36 (Figures 1, 2, 3 and 4) extending parallel to each other and lying preferably in a horizontal plane; these guide rods are fixedly secured in place in any suitable manner and they slidably support a carriage generally indicated at 37, the latter being conveniently and preferably of U-shaped cross-section, as is better shown in Figure 4, and having, therefore, upstanding end parts 38 and 39 jointed by the relatively heavy cross or base part 40. It is through the base part 40 that the fixed guide rods 35—36 pass, thus slidably supporting the carriage 37 for movement horizontally toward or away from the transversely alined guiding stud 25 and cutter 15ª.

A feed screw 41 (Figures 3 and 4) is in threaded engagement with the carriage 37 and is journaled in the front plate support 33 and the standard 11 at the rear, any suitable means being provided to hold the feed screw 41 against bodily movement in an axial direction; its outer end is provided with a crank or handle 42 (Figure 1) whereby the feed screw may be manually rotated in either direction and thus to cause the main carriage 37 to move along the guide rods 35—36.

Bridged across the upstanding arms 38—39 of the main carriage 37 (Figures 3, 1 and 4) and suitably fixed therein are two parallel horizontally extending guide rods 43 and 44 upon which is slidably supported an auxiliary carriage generally indicated at 45 (Figures 3 and 4). Auxiliary carriage 45 is of less width than the spacing between the carriage arms 38—39 (see Figures 3 and 4) and conveniently is made of a suitable block of metal through which the guide rods 43—44 pass and it carries or has related with or to it two gripping devices or vises generally indicated (see Figure 4) at 46 and 47 for gripping respectively the key to be duplicated and the key blank to be cut.

In order better to understand the construction and action of these gripping devices, reference might first be made to Figure 3 in which a key generally indicated at 48 of the type to be duplicated is shown in plan view and will be seen to comprise a shank 48ª whose longitudinal side edges are parallel and whose cross-section (see Figure 4) is rectangular and whose keyhole entering end is shaped to provide a reentrant V-shaped end 48ᵇ; extending along its longitudinal center line and on each side of the shank 48ª are grooves 48ᶜ and 48ᵈ (Figure 4) which mate with each other but which waver or depart irregularly, according to the code of the key or lock, from the longitudinal center line of the key. It is within these grooves that the tumbler pins of the lock are received when the key is inserted into the keyhole and it is by the varying shape of the grooves or by the departures thereof from the center line that the tumbler pins are set so as to permit the lock cylinder to be rotated and the lock unlocked.

Incidentally, the depth of the groove, as well as its width, may vary, depending upon the lock for which the particular key is intended or adapted.

The key blank is shown in Figure 3 at 49 and will be seen to be similarly shaped as is the key 48 except that it is devoid of the groove or grooves and which my apparatus and method are to provide in the key blank.

In order to grip the key and the key blank, the auxiliary carriage 45 (Figure 4) is provided with shoulders 45ª and 45ᵇ whose right-hand faces extend parallel to the guide rods 35—36 and it is against these shoulders that the key 48 and key blank 49 are respectively laid, resting flat upon the upper face of the carriage 45.

If desired, plates 50 and 51 (Figures 3 and 4) may be secured on top of these shoulders 45ª and 45ᵇ, respectively, to provide an overhang, in a direction toward the right, under which the key and key blank are inserted.

The right-hand edges of the shanks 48ª and 49ª of the key and key blank are engaged by blocks 45ᶜ and 45ᵈ, respectively, these blocks having inclined right-hand side edges 45ᵉ and 45ᶠ adapted to rest against similarly inclined faces 45ᵍ and 45ʰ in the carriage 45 so that, upon downward movement of the blocks 45ᶜ and 45ᵈ, when screws 52 and 53, threaded into the carriage 45, are screwed down, the blocks 45ᶜ and 45ᵈ move toward the left, as viewed in Figures 3 and 4, and jam or wedge the key 48 and the key blank 49 against the shoulders 45ª and 45ᵇ, respectively, thus securely locking and gripping these parts in place.

The screws 52—53 are, as above noted, threaded into the block-like carriage 45 and pass through holes in the gripping blocks 45ᶜ and 45ᵈ that are large enough to allow for the lateral movement of the gripping blocks due to the cam actions of the above-mentioned inclined faces. Moreover, the gripping that results from this cam action is exerted also in a downward direction, due to the downward movement of the gripping blocks, and thus the key and key blank are firmly forced and held down against the upper horizontal faces of the auxiliary carriage 45, the overhanging plates 50 and 51 (Figure 4) preventing this downward force of the gripping blocks from tilting the key or key blank in clockwise direction, as viewed in Figure 4.

Thus the key and key blank are securely laid down and held in a horizontal plane and with their longitudinal axes alined with the path of movement of the main carriage 37 along the guide rods 35—36.

The horizontal spacing between the gripping devices 46 and 47 and hence between the key 48 and the key blank 49 is the same as the horizontal spacing (see Figure 2) between the guide 25 and the cutter 15ª. The cutter 15ª may be shaped like a suitable milling cutter and is longitudinally fluted to provide a suitable number of cutting edges, as is better shown in Figure 5, and it may or may not, as desired, have cutting edges across its lower end face, as viewed in Figure 2. Both the guide 25 and the cutter 15ª have diameters equal to the smallest width of groove which the guide 25 must follow and which, in the key blank, the cutter 15ª is to cut although, as I describe more clearly hereinafter, I am not limited to cutting grooves of this minimum width.

The auxiliary carriage 45 is provided with a screw or stud 56 (Figures 2 and 3) to which are connected the adjacent ends of two coiled springs 57 and 58 whose remote or outer ends are connected respectively to levers 59 and 60 pivotally mounted on the front face of the main carriage 37, as by screws 61 and 62, respectively. As is better shown in Figures 1 and 2, the levers 59 and 60 are provided with handle portions 59ª and 60ª whereby they may be manually manipulated.

When the levers 59—60 are swung into the positions shown in Figure 2, the tensions of the springs 57—58 may be either virtually ineffective or are made to balance so that the auxiliary carriage 45 may be manually moved along the guide rods 43—44 as may be desired when the guide and the cutting tool are preliminarily set.

If, however, one lever, such as the lever 59, is left in the position shown in Figure 2 but lever 60 is swung in clockwise direction so that it carries the point at which spring 58 is connected to it below the line connecting screw 56 and screw 62, spring 58 is thus tensioned and biases the auxiliary carriage 45 toward the right, as viewed in Figures 2, 3 and 4; a pin 63 (Figure 2) in the front face of the main carriage 37 limits the extent to which lever 60 can be swung in this clockwise direction.

On the other hand, if lever 60 is left in the position shown in Figure 2 and lever 59 is swung in counterclockwise direction so that it comes up against the stop pin 64, spring 57 is now tensioned, holding lever 59 in the position in which it was swung up against the stop 64 and biasing the auxiliary carriage 45 toward the left, as viewed in Figures 2, 3 and 4.

As is better shown in Figures 4 and 3, screws 65 and 66, threaded into the upstanding side portions 38—39 of the main carriage 37, form adjustable stops for limiting the extent to which the auxiliary carriage 45 may be biased in one direction or the other depending upon the setting of the levers and hence upon which spring is brought into effect.

Assuming now that the guide 25 and the cutter 15ª have been appropriately adjusted in a preferred manner, as is described hereinafter, and assuming that the cutter is shaped as is indicated in Figure 5 and rotates in clockwise direction, I swing lever 60 (Figure 2) into the position shown in Figure 2 and swing lever 59 in counter-clockwise direction up against the stop 64, thus tensioning spring 57 and biasing the auxiliary carriage 45, which with the main carriage 37 occupies the withdrawn position shown in Figure 1, toward the left, as viewed in Figures 2, 3 and 4. I now operate the feed screw 41 by rotating handle 42 (Figure 1) so as to move the main carriage 37 and the parts carried by it toward the right, as viewed in Figure 1, thus advancing the key blank 49 (Figure 3) and the key 48 which is to be duplicated respectively toward the cutter 15ª and the guide member 25, the auxiliary carriage 45 being biased toward the left (Figures 2 and 3).

The reentrant end 48ᵇ (Figure 3) of the key 48 coacts with the guide 25 to slide the auxiliary carriage 45 transversely so that continued movement along the guide rods 35—36 causes the guide 25 to enter the slot 48ᶜ of the key 48, these actions bringing the cutter 15ª into proper position to begin cutting along the general central portion of the shank 49ª of the key blank 48 (Figure 3).

The auxiliary carriage 45 being, however, biased toward the left by the spring 57, the right-hand wall of the slot 48ᶜ is thus made to bear against the guide 25 whereupon the position of the auxiliary carriage 45 along its guide rods 43—44 is at any instant during the movement of the main carriage 37 along the guide rods 35—36 determined by the coaction of the guide 25 and the right-hand wall of the slot 48ᶜ, all under the action of the spring 57.

The cutter 15ª is thus made to cut a groove in the upper face of the key blank 49 whose general contour or shape in a direction lengthwise of the key blank is an exact duplicate of the shape or contour of the groove or slot 48ᶜ in the key 48 itself, the cutting ceasing when the carriage has been moved sufficiently to bring the terminus of the slot 48ᶜ into engagement with the guide 25, this engagement stopping the feeding movement of the parts under the action of the feed screw 41.

I then stop rotating the feed screw 41 and now swing lever 59 into the position shown in Figure 2 and swing lever 60 in clockwise direction and up against the stop 63, thus tensioning spring 58 and thus biasing the auxiliary carriage 45 toward the right, as viewed in Figures 2, 3 and 4. I now commence a reverse rotation of the feed screw 36 in order now to cause the key 48 to be traversed relative to the guide 25 but in a direction reversed from that which initially took place as above described.

On this return movement, it is now the left-hand wall of the key groove 48ᶜ (Figure 3) which is forced, under the action of spring 58, into constant engagement with the guide 25, whereupon the cutter 15ª is made to cut the left-hand wall correspondingly in the slot or groove in the key blank 49, the right-hand wall of which is cut or determined during the initial traverse.

During these actions, several important coactions and actions take place. To begin with, I achieve the important advantage, on the first traverse, during which the key blank 49 (see now Figure 5) is moved in the direction of the arrow X, of having the right-hand wall 49ᵇ of the groove cut or determined by a cutting action which results from feeding the key blank 49 in a direction opposed to that in which the effective wall-cutting parts of the cutter 15ª move or rotate, spring 57 insuring a positive following by the auxiliary carriage 45 of the configuration of the right-hand wall of the groove 48ᶜ in the key 48. On the traverse in the reversed direction, that is, with the carriages and hence the key blank 48 moved in the direction of the arrow Y in Figure 5, I achieve, due to the reversed direction of movement of the key blank 49, a similar advantage because, though the effective cutting portions of the cutter that determine the left-hand wall 49ᶜ move in a direction reversed from the direction taken when the right-hand wall 49ᵇ was cut, the key blank 49 is nevertheless again fed in opposition to the direction of cutting.

Furthermore, on the second traverse, the auxiliary carriage is biased in the opposite direction and hence in a direction toward the right; thus, even though the groove to be cut is wider than the diameter of the cutter 15ª, I am, nevertheless, enabled to cut dependably and accurately grooves or slots of widely varying widths by using only one size of cutter.

The above-described actions are diagrammatically illustrated in Figure 5 in which the key blank 49 is shown in full lines with respect to the fixed cutter 15ª at one point in its initial traverse in the direction of the arrow X cutting the side wall 49ᵇ of the groove and in broken lines I have shown the position of the key blank during its second traverse, now in the direction of the arrow Y, cutting the left-hand wall 49ᶜ of the groove, even though the width of the groove is materially greater than the diameter of the cutter 15ª.

Various means may be employed to set the vertical positions of the guide 25 and the cutter 15ª; I may, for example, use the key to be duplicated to determine the lowermost position which the guide 24—25 should assume in order that the guiding member 25 properly bottoms in the groove and then by any suitable means adjust the height of the cutter 15 so that the clearance of the cutter above the face of the auxiliary carriage 45 is the same as the clearance between the guide 25 and the upper face of the carriage 45, and thus insure that the cutter 15ª reproduces in the key blank 49 not only the shape and width of the groove in the key 48 but also its depth.

Preferably, however, I provide a gage bar 70 (Figure 6) of a width equal to that of the key or key blank so that it may be readily inserted in and gripped by the vises or gripping devices 46—47; the gage bar 70 has a thickness equal to the clearance which the guide 25 and the cutter 15ª should have from the upper face of the chuck or carriage 45 in order that the one may properly bottom in the key groove and that the other may cut a groove of the desired depth.

By inserting the gage bar successively in the gripping devices 46 and 47, the guide 25 and the cutter 15ª may be set, by the screws 30 and 28, respectively, as already hereinabove described, in order to have the desired clearance.

Moreover, the gripping devices 46—47 readily accommodate keys or key blanks of different widths; thus, referring to Figure 4, parts of lesser width may be gripped, the movable blocks 45ᶜ and 45ᵈ simply occupying lower positions than shown in Figure 4 whereas, when gripping parts wider than those shown in Figure 4, these blocks occupy final clamping positions higher than those shown in this figure. The inclined coacting faces 45ᵉ—45ᵍ and 45ᶠ—45ʰ, automatically allowing for the accommodation of different widths throughout a substantial range.

After the groove has been cut on one face of the key blank, the operation of producing a groove along the other face of the key blank, if such an additional groove is required, it will be clear in view of what has already been fully described above, the various steps and operations as above described being appropriately repeated.

It will thus be seen that there has been provided in this invention an apparatus in which the various objects hereinabove noted, together with many thoroughly practical advantages, are successfully achieved. It will be seen that the apparatus is of a thoroughly practical nature and is well adapted to meet the varying requirements of hard practical use.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In key cutting apparatus, in combination, a rotary cutter rotated about a vertical axis, a guide spaced therefrom, a main carriage, means for guiding said carriage along a path to traverse it past both said cutter and said guide, an auxiliary carriage on said main carriage, means mounting said auxiliary carriage for movement relative to the main carriage in a direction transversely to the direction of movement of said main carriage, a pair of spaced chucks on said auxiliary carriage, one for holding a longitudinally grooved key for coaction with said guide and the other to hold a key blank for action thereon by said cutter, spring means adapted when tensioned to bias said auxiliary carriage in one direction relative to said main carriage, spring means adapted when tensioned to bias said auxiliary carriage in the opposite direction relative to the main carriage, and independently acting means, one for each of said spring means, for determining at will the action of said spring means.

2. In key cutting apparatus, in combination, a rotary cutter rotated about a vertical axis, a guide spaced therefrom, a main carriage, means for guiding said carriage along a path to traverse it past both said cutter and said guide, an auxiliary carriage on said main carriage, means mounting said auxiliary carriage for movement relative to the main carriage in a direction transversely to the direction of movement of said main carriage, a pair of spaced chucks on said auxiliary carriage, one for holding a longitudinally grooved key for coaction with said guide and the other to hold a key blank for action thereon by said cutter, spring means adapted when tensioned to bias said auxiliary carriage in one direction relative to said main carriage, spring means adapted when tensioned to bias said auxiliary carriage in the opposite direction relative to the main carriage, and two levers, each connected with one of said spring means and each forming with its spring means a self-locking toggle when swung in one direction, for tensioning said spring means.

3. In key cutting apparatus, in combination, a rotary cutter rotated about a vertical axis, a guide spaced therefrom, a main carriage, means for guiding said carriage along a path to traverse it past both said cutter and said guide, an auxiliary carriage on said main carriage, means mounting said auxiliary carriage for movement relative to the main carriage in a direction transversely to the direction of movement of said main carriage, a pair of spaced chucks on said auxiliary carriage, one for holding a longitudinally grooved key for coaction with said guide and the other to hold a key blank for action thereon by said cutter, spring means connected between said two carriages, and means for determining at will the direction in which said spring means acts, thereby to determine the direction in which said auxiliary carriage is biased along its guiding means and relative to the main carriage.

4. In key cutting apparatus, in combination, a rotary cutter rotated about a vertical axis, a guide spaced therefrom, a main carriage, means for guiding said carriage along a path to traverse it past both said cutter and said guide, an auxiliary carriage on said main carriage, means mounting said auxiliary carriage for movement relative to the main carriage in a direction transversely to the direction of movement of said main carriage, a pair of spaced chucks on said auxiliary carriage, one for holding a longitudinally grooved key for coaction with said guide and the other to hold a key blank for action thereon by said cutter, a spring for urging said auxiliary carriage in one direction along its guiding means, a spring for urging said auxiliary carriage in opposite direction along its guiding means, and means for controlling the effectiveness of said springs.

5. In key cutting apparatus, in combination, a rotary cutter rotated about a vertical axis, a guide spaced therefrom, a main carriage, means for guiding said carriage along a path to traverse it past both said cutter and said guide, an auxiliary carriage on said main carriage, means mounting said auxiliary carriage for movement relative to the main carriage in a direction transversely of the direction of movement of said main carriage, a pair of spaced chucks on said auxiliary carriage, one for holding a longitudinally grooved key for coaction with said guide and the other to hold a key blank for action thereon by said cutter, a spring for urging said auxiliary carriage in one direction along its guiding means, a spring for urging said auxiliary carriage in opposite direction along its guiding means, and means comprising manually controllable connections between said springs and a carriage for selecting at will which spring is to be made effective.

6. In key cutting apparatus, in combination, means for holding a key blank, a rotary cutter for cutting a groove in the key blank, means for causing said cutter to cut a groove of greater width than the diameter of the cutter, said last-mentioned means including means mounting said holding means for movement in a direction lengthwise of the key blank and in a direction transversely thereto, means for moving said holding means in said first-mentioned direction, and means controlling movement of said holding means in said transverse direction and including means for biasing said holding means first against one side of said cutter and then against the other side of said cutter.

7. In key cutting apparatus, in combination, a cutter, a guide spaced therefrom, means for holding a key having a longitudinal groove therein, means spaced therefrom by substantially the same spacing that exists between said cutter and said guide for holding a key blank to be operated upon by said cutter, means for traversing said two holding means relative to said guide and said cutter, and means for biasing said two holding means in either of two opposed directions each transverse to the direction of traversing movement of said two holding means.

8. In key cutting apparatus, in combination, a cutter, a guide spaced therefrom, means for holding a key having a longitudinal groove therein, means spaced therefrom by substantially the same spacing that exists between said cutter and said guide for holding a key blank to be operated upon by said cutter, means for traversing said two holding means relative to said guide and said cutter, spring means, and means for making said spring means effective to yieldingly urge said holding means in a direction transverse to the line of traversing movement thereof.

9. In key cutting apparatus, in combination, a cutter, a guide spaced therefrom, means for holding a key having a longitudinal groove therein, said guide projecting toward said holding means to an extent and having a dimension such that it enters into the longitudinal groove in a key held in said holding means, means spaced therefrom by substantially the same spacing that exists between said cutter and said guide for holding a key blank to be operated upon by said cutter, means mounting said two holding means for movement in a direction lengthwise of the groove in said key and relative to said guide and said cutter, whereby, upon movement of said two holding means in said direction, said key is traversed lengthwise of said guide with said guide in said groove and said key blank is traversed lengthwise of itself and relative to said cutter to cut a groove in said blank, and means for determining the depth of groove cut by said cutter.

10. In key cutting apparatus, in combination, a cutter, a guide spaced therefrom, means for holding a key having a longitudinal groove therein, means spaced therefrom by substantially the same spacing that exists between said cutter and said guide for holding a key blank to be operated upon by said cutter, means for traversing said two holding means relative to said guide and said cutter, a hollow spindle carrying said cutter, and means operating through said hollow spindle for determining the position of the cutter relative to said spindle, thereby to determine the depth of groove cut by said cutter.

11. In key cutting apparatus, in combination, a cutter, a guide spaced therefrom, means for holding a key having a longitudinal groove therein, said guide projecting toward said holding means to an extent and having a dimension such that it enters into the longitudinal groove in a key held in said holding means, means spaced therefrom by substantially the same spacing that exists between said cutter and said guide for holding a key blank to be operated upon by said cutter, means for relatively traversing said two holding means and to said guide and said cutter, a hollow support for said guide, said guide being capable of sliding movement relative to said hollow support for determining the amount of projection thereof toward said key-holding means, and means operative upon said guide through said hollow support for setting the extent of projection of said guide with respect to the bottom of the groove in the key.

12. In key cutting apparatus, in combination, a cutter, a guide spaced therefrom, means for holding a key having a longitudinal groove therein, means spaced therefrom by substantially the same spacing that exists between said cutter and said guide for holding a key blank to be operated upon by said cutter, means mounting said two holding means for movement in a direction lengthwise of the groove in said key and relative to said guide and said cutter, whereby, upon movement of said two holding means in said direction, said key is traversed lengthwise of said guide with said guide in said groove and said key blank is traversed lengthwise of itself and relative to said cutter to cut a groove in said blank, and self-locking toggle means having one link yieldable for yieldingly urging said holding means in a direction transverse to the line of movement of said holding means.

13. In key cutting apparatus, in combination, a cutter, means for holding a key blank for operation thereon by said cutter, a guide, means for holding a master key for cooperation with said guide, means for traversing said two holding means relative to their respective guide and cutter, double-acting spring means capable of biasing said holding means in either of two directions, and means selectable at will for determining the direction in which said spring means operates.

14. In key cutting apparatus, in combination, a cutter, means for holding a key blank for operation thereon by said cutter, a guide, means for holding a master key for cooperation with said guide, means for traversing said two holding means relative to their respective guide and cutter, and a self-locking toggle, one link of which is yieldable, for biasing said holding means.

HERMAN HANSEN.